(12) United States Patent
Schmidt et al.

(10) Patent No.: US 9,427,885 B2
(45) Date of Patent: Aug. 30, 2016

(54) METHOD OF INTRODUCING A STRUCTURE IN A SUBSTRATE

(75) Inventors: Christian Schmidt, Le Bouveret (CH); Leander Dittmann, Lausanne (CH); Enrico Stura, Grandvaux (CH)

(73) Assignee: picoDrill SA, Lausanne (CH)

( * ) Notice: Subject to any disclaimer, the term of this patent is extended or adjusted under 35 U.S.C. 154(b) by 727 days.

(21) Appl. No.: 13/132,436

(22) PCT Filed: Dec. 2, 2009

(86) PCT No.: PCT/EP2009/008598
§ 371 (c)(1),
(2), (4) Date: Aug. 3, 2011

(87) PCT Pub. No.: WO2010/063462
PCT Pub. Date: Jun. 10, 2010

(65) Prior Publication Data
US 2011/0278648 A1    Nov. 17, 2011

Related U.S. Application Data

(60) Provisional application No. 61/119,255, filed on Dec. 2, 2008.

(51) Int. Cl.
*H01L 21/326* (2006.01)
*B26F 1/28* (2006.01)
*B26D 7/10* (2006.01)
*B23K 26/38* (2014.01)
*B23K 26/00* (2014.01)

(52) U.S. Cl.
CPC ............ *B26F 1/28* (2013.01); *B23K 26/0081* (2013.01); *B23K 26/384* (2015.10); *B23K 26/385* (2013.01); *B26D 7/10* (2013.01); *Y10T 428/24273* (2015.01)

(58) Field of Classification Search
CPC ........ B26D 7/10; B26F 1/28; B23K 26/0081; B23K 26/384; B23K 26/385; Y10T 428/24273
See application file for complete search history.

(56) References Cited

U.S. PATENT DOCUMENTS 4,777,338 A * 10/1988 Cross ........................... 219/69.1
5,777,292 A *  7/1998 Grigorov et al. ......... 204/157.15

(Continued)

FOREIGN PATENT DOCUMENTS

JP        S40-027273        11/1965
JP        H05-090243        4/1993

(Continued)

OTHER PUBLICATIONS

International Search Report issued May 3, 2010 in PCT/EP09/08598 filed Dec. 2, 2009.

(Continued)

*Primary Examiner* — Mary Wilczewski
(74) *Attorney, Agent, or Firm* — Oblon, McClelland, Maier & Neustadt, L.L.P.

(57) ABSTRACT

This invention relates to methods for the production of micro-structured substrates and their application in natural sciences and technology, in particular in semiconductor, microfluidic and analysis devices. It concerns a method of introducing a structure, such as a hole or cavity or channel or well or recess or a structural change by providing a controlled electrical discharge.

54 Claims, 12 Drawing Sheets

(56) References Cited

U.S. PATENT DOCUMENTS

Figure 1:
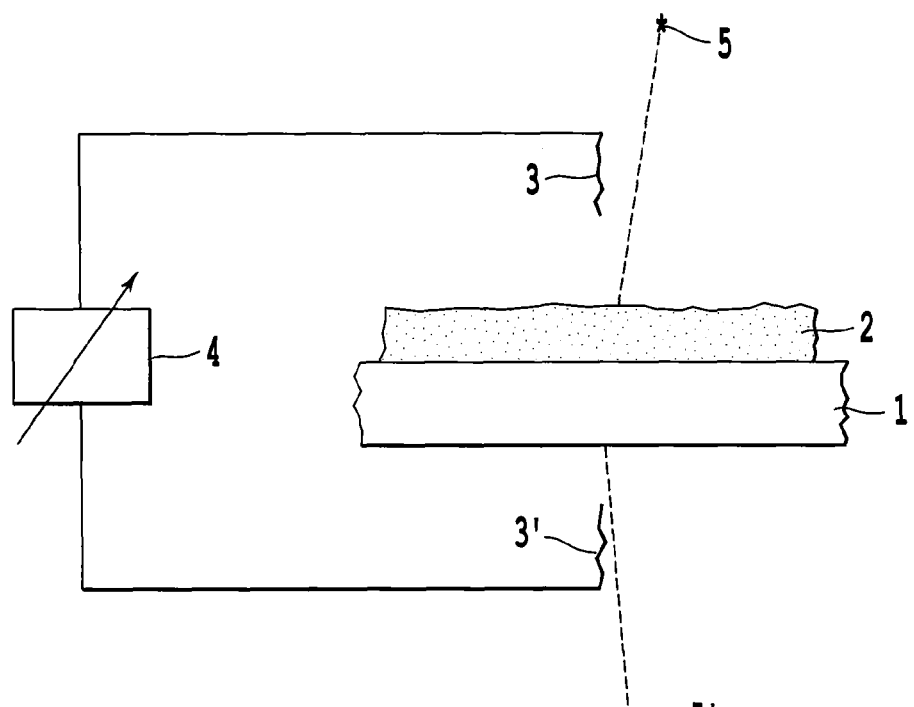

| | | | |
|---|---|---|---|
| 5,868,947 A | 2/1999 | Sakaguchi et al. | |
| 6,348,675 B1* | 2/2002 | Takagi | 219/384 |
| 6,362,079 B1* | 3/2002 | Iwata et al. | 438/468 |
| 6,804,105 B2* | 10/2004 | Grigorov et al. | 361/226 |
| 7,482,198 B2* | 1/2009 | Bauer | H01L 21/486 257/E21.499 |
| 8,389,903 B2* | 3/2013 | Schmidt | B26F 1/28 219/162 |
| 8,529,738 B2* | 9/2013 | Von Gutfeld et al. | 204/275.1 |
| 8,736,026 B2* | 5/2014 | Schmidt | B23K 26/0081 257/618 |
| 8,759,707 B2* | 6/2014 | Schmidt | B26D 7/10 219/384 |
| 9,168,614 B2* | 10/2015 | Schmidt | B23K 26/385 |
| 2008/0047935 A1 | 2/2008 | Schmidt | |
| 2008/0258267 A1* | 10/2008 | Nakashima | 257/621 |
| 2010/0276409 A1* | 11/2010 | Schmidt | 219/162 |
| 2010/0314723 A1* | 12/2010 | Schmidt | B26F 1/28 257/629 |
| 2011/0042132 A1* | 2/2011 | Dittmann | B26F 1/28 174/266 |
| 2011/0304023 A1* | 12/2011 | Schmidt | B23K 26/0081 257/618 |
| 2012/0138339 A1* | 6/2012 | Dittmann | B26F 1/28 174/250 |
| 2013/0326870 A1* | 12/2013 | Schmidt | B26D 5/00 29/829 |
| 2013/0330506 A1* | 12/2013 | Schmidt | B23K 26/385 428/131 |

FOREIGN PATENT DOCUMENTS

| | | |
|---|---|---|
| WO | 2005 097439 | 10/2005 |
| WO | 2009 059786 | 5/2009 |
| WO | 2009 074338 | 6/2009 |

OTHER PUBLICATIONS

Office Action mailed on Oct. 1, 2013 for Japanese Application No. 2011-538893.

* cited by examiner

METHOD OF INTRODUCING A STRUCTURE IN A SUBSTRATE

FIELD OF THE INVENTION

This invention relates to methods for the production of micro-structured substrates and their application in natural sciences and technology, in particular in semiconductor, microfluidic and analysis devices.

BACKGROUND OF THE INVENTION

Many microtechnological applications and devices require high aspect ratio structures such as holes. One eminent example is Through-hole silicon via (TSV) used as interconnect in and between silicon chips. The making of high aspect ratio holes (harh) is in many cases difficult, expensive or even impossible. Limits of current hole making technologies such as laser ablation or etching are the minimum hole size, the aspect ratio and the roughness of the inner hole linings/walls. These limits currently pose a serious bottleneck to the large scale application of stacked silicon chips. The devices and methods described here provide a simple, inexpensive and precise approach to circumvent these limitations.

A further problem of current micromachining technologies is the specificity to selected materials. For instance, anisotropic etching of Si using KOH solutions is a simple way to produce grooves and holes in silicon but does not work with many other semiconductors or amorphous materials. Even with Si it functions only for specific crystal lattice orientations. It was therefore a goal of the here disclosed invention to provide a method that allows the machining of many different materials, most of them relevant to current microtechnology such as Si, Ge, GaAs, InP, Sapphire, glass, zirconia. Modifications to the method to machine different materials or even material classes were sought to be minor and easily implantable.

A further goal of the disclosed invention was the applicability of the method to the fabrication of arrays of holes. WO2005/097439 and PCT/EP2008/009419 disclose methods of generating structures in substrates using the application of voltages to a substrate. The methods disclosed therein do not allow a close spacing of holes due to the high voltages applied and the occurrence of voltage-flash-overs through already existing holes. Accordingly there is a need for methods and devices to prevent these detrimental effects for array formation.

Also, many miniaturized fluidic and chemical/biological analysis devices require small reservoirs and connection channels. The dimensions of these channels and containers are often in the micrometer range. Common micromachining techniques, developed mostly for planar structures, fall short of making wells and channels which enter deep into the chip/substrate. That is, the achievable aspect ratio—the ratio between the length and the diameter of a hole, is limited to typically 1:10. This is in particular true for the machining of glass and glass like materials such as fused silica. Significant drawbacks for large scale application derive also from the high production cost.

On the other hand, channels with very high aspect ratio allow for efficient electro-osmotic pumping of fluids through these channels, requiring e.g. for channels of 150 um length and 2 um diameter only small voltages and currents (e.g. 5 V) for significant fluid velocities within the channel. Very high aspect ratios will also allow to connect both sides of a typical glass chip of e.g. 0.5 mm thickness by trans-chip channels, thereby enabling simple three-dimensional fluid designs.

Channels with picoliter capacities will also provide a basis for picoliter fluidics, utilizing fluid transport and mixing effects irrelevant in larger volumes.

Accordingly it was an object of the present invention to provide for a method allowing the production of high quality perforated substrates. It was also an object of the present invention to provide for a method of production of such high quality membrane carriers which method is easy to perform and reproducible. It was furthermore an object to provide for a method allowing the controlled production of holes, cavities or channels in substrates, wherein the geometrical features of the holes, cavities and channels can be easily controlled and influenced. It was also an object of the present invention to provide for a method allowing the mass production of perforated substrates. It was furthermore an object of the present invention to provide a method of hole production that can be applied to substrates that were hitherto difficult to process, such as glass, sapphire or elemental silicon.

SUMMARY OF THE INVENTION

The objects of the present invention are solved by a method of introducing a structure, such as a hole or cavity or channel or well or recess, or a structural change, such as a transition from a crystalline structure to an amorphous structure, in a substrate or a region thereof, said method comprising the steps:
  a) providing a substrate which is electrically insulating or semiconducting at room temperature, and placing it between at least two electrodes connected to a user-controlled voltage supply,
  b) applying, by means of said user-controlled voltage supply, a voltage of user-defined magnitude across a region of said substrate, said voltage being sufficient to give rise to an increase in electrical current through said substrate or said region, thereby applying a defined amount of electrical energy to said substrate,
  c) optionally, applying additional energy, preferably heat, to said substrate or said region so as to increase the temperature and the electrical conductivity of said substrate or said region so as to initiate the current flow in step b), said additional energy, preferably heat, originating either from an additional energy or heat source or from components of said voltage applied in step b),
  d) dissipating said electrical energy applied in step b) in said substrate,
wherein step d) is controlled solely by (i) the user-defined magnitude of the applied voltage of step b), (ii) a user-defined period of time of step b), (iii) an impedance of said voltage supply, or (iv) any combination of (i)-(iii).

In one embodiment, said control of step d) by controlling (i), (ii), (iii) or (iv) is achieved using a programmed or feedback circuit analysing the trans-substrate current or trans-substrate voltage over time.

In one embodiment, said control of step d) by controlling (i), (ii), (iii) or (iv) is achieved by solely user-defining (i), (ii), (iii) or (iv) and without using a programmed or feedback circuit analysing the trans-substrate current or trans-substrate voltage over time.

In one embodiment, said user-defined magnitude of voltage is in the range of 10 V to $10^6$ V, preferably from $10^2$ V to $3 \times 10^5$ V, more preferably from $10^3$ V to $30 \times 10^3$ V, and most preferably from $2 \times 10^3$ V to $15 \times 10^3$ V.

In one embodiment, said user defined period of time is in the range of from 1 ms to 5000 ms, preferably from 10 ms to 2000 ms, more preferably from 10 ms to 1000 ms, and even more preferably from 10 ms to 500 ms.

In one embodiment, said impedance of said voltage supply is an impedance>1 Ohm, preferably >10 kOhm, more preferably >100 k Ohm, and, even more preferably >1 MOhm.

In one embodiment, said impedance is in the range from 1 Ohm to 1 GOhm, wherein, preferably, said impedance is variable within said range during performance of said method.

In one embodiment, said electrically insulating or semiconducting substrate is made of a material selected from a group comprising carbon-based polymers, such as polypropylene, fluoropolymers, such as Teflon, silicon-based substrates, such as glass, quartz, silicon nitride, silicon oxide, silicon based polymers such as Sylgard, semiconducting materials such as elemental silicon, including doped silicon and crystalline silicon, germanium, compound semiconductors, such as gallium arsenide, indium phosphide, as well as aluminium based crystalline materials such as alumina, spinel, sapphire, as well as ceramics such as zirconia.

In one embodiment, step d) is initiated by either (i) applying a voltage of user-defined magnitude across a region of said substrate in step b), said user defined magnitude of voltage being sufficient to give rise to an increase in electrical current through said substrate or said region and a subsequent dissipation of said electrical energy in said substrate, (ii) applying a voltage of user-defined magnitude across a region of said substrate in step b), said user defined magnitude of voltage not being sufficient to give rise to an increase in electrical current through said substrate or said region and to a subsequent dissipation of said electrical energy in said substrate, and reducing the distance between each of the electrodes and the substrate and, optionally, contacting said substrate with said electrodes, (iii) performing step c), or (iv) a combination of (i)-(iii).

In one embodiment, step c) is omitted, wherein, preferably, said substrate is a substrate having an electrical resistivity$\leq 10^9$ $\Omega$cm at room temperature.

In one embodiment, said substrate is electrically semiconducting at room temperature and is preferably made of a semiconducting material selected from elemental silicon, including doped silicon and crystalline silicon, germanium, compound semiconductors such as gallium arsenide, and indium phosphide.

In another embodiment, step c) is performed, wherein, preferably, step c) is performed using an additional energy source which is selected from a heated electrode, a heating element, a laser, a focussed light source, a UV light source, a gas flame, and a high frequency electromagnetic field device. Such a high frequency electromagnetic field device is, for example, a Tesla transformer.

In one embodiment, said additional energy source is a laser which preferably has a wavelength in a wavelength range that is at least partially absorbed by said substrate.

In one embodiment, the site of application of additional energy in step c) determines the region of said substrate in which said structure or said structural change is introduced.

In one embodiment, said substrate which is electrically insulating at room temperature or electrically semiconducting at room temperature is provided in step a) having at least one electrically insulating layer attached, wherein, preferably, said electrically insulating layer is solid, liquid or gaseous at room temperature.

Such insulating layer preferably has a thickness in the range of from 1 $\mu$m to 1 cm, more preferably from 10 $\mu$m to 1 mm.

In one embodiment, said electrically insulating layer is gaseous at room temperature and is not air.

In one embodiment, said electrically insulating layer has an insulating region which is adjacent to and in contact with said substrate region in which substrate region a structure or structural change is to be introduced, and is preferably effectively reducing the voltage across the substrate (shielding effect) without lowering the voltage between the electrodes, and wherein step c) is performed such that in said electrically insulating layer the electrical conductivity is raised in said insulating region so as to reduce its voltage shielding effect and augmenting the trans-substrate voltage in said substrate region.

In one embodiment, said electrically insulating layer has an insulating region which is adjacent to and in contact with said substrate region in which substrate region a structure or structural change is to be introduced, wherein step c) is performed such that said electrically insulating layer, if provided as a solid in step a), is liquefied in said insulating region, or is performed such that said electrically insulating layer, if provided as a liquid in step a), is partially evaporated in said insulating region,
and wherein during step d), said electrically insulating layer is partially displaced in said insulating region, through the dissipation of said electrical energy, and wherein, after step d), said gaseous, liquefied or partially evaporated electrically insulating layer flows into said generated structure and thereby closes and at least partially fills said structure.

In one embodiment, said electrically insulating layer is attached to said substrate in such a manner that it covers said substrate in step a) or is covered by said substrate in step a), and said substrate region lies opposite said insulating region.

In one embodiment, the insulating layer reduces the voltage across the substrate by formation of an internal counter electric field due to electrical polarization of the insulating layer material.

In one embodiment, the insulating layer is also used to improve the flatness/surface quality of the region surrounding the structure being introduced by absorbing material ejected during the process into the insulating layer and thus avoiding its direct redeposition onto the substrate surface. In one embodiment, the absorbed material is removed together with the insulation layer after the structure has been introduced.

In one embodiment, the insulating layer is used to create a mask on said substrate which mask exposes only the region(s) where the structure(s) will be introduced, protecting the rest of the substrate from unwanted dissipation of electric energy.

In one embodiment, the insulating layer is removed after a structure or an array of structures or a structural change or several structural changes have been introduced into the substrate.

In one embodiment, step c) is performed by directly heating the insulating layer such as through absorption of laser radiation of a wavelength absorbed by the insulating layer.

In one embodiment, step c) is performed by indirectly heating the insulating layer by heating the attached substrate and utilizing heat transfer from the heated substrate to the attached insulating layer.

In one embodiment, said electrically insulating layer is made of a material which is solid and electrically insulating at room temperature and preferably selected from wax, in particular paraffin wax, rubber, hot melt adhesive, poly (styrene-butadiene-styrene), and polyurethane.

In one embodiment, said electrically insulating layer is made of a material which is liquid at room temperature, and which is electrically insulating at room temperature or polar or both and is preferably selected from dodecane, paraffin, water, or high viscosity water based liquids such as Ficoll™ solution or honey like liquids.

In one embodiment, said electrically insulating layer is made of a material which is gaseous at room temperature and is preferably selected from $SF_6$, Ar, $N_2$, $CO_2$.

In one embodiment, said substrate is electrically insulating at room temperature and is preferably made of a substrate material selected from glass, quartz, diamond, alumina, sapphire, aluminium nitride, zirconia, and spinel, more preferably quartz and glass, wherein, preferably, said substrate has an electrical resistivity $>10^9$ Ohm cm at room temperature.

In one embodiment, said electrically insulating layer, if present, is made of a material which is solid and electrically insulating at room temperature and is preferably selected from paraffin wax, rubber and hot-melt adhesive.

In one embodiment, step c) is performed using a laser, preferably having a wavelength in a wavelength range which is at least partially absorbed by said substrate material and/or said insulating layer, if present.

In one embodiment, said substrate is electrically semiconducting at room temperature and is preferably made of a substrate material selected from elemental silicon, including doped silicon and crystalline silicon, germanium, compound semiconductors such as gallium arsenide and indium phosphide.

Preferably, said substrate has an electrical resistivity$\leq 10^9$ Ohm cm at room temperature.

In one embodiment, said electrically insulating layer, if present, is made of a material which is liquid and electrically insulating at room temperature, or polar or both and which is preferably selected from dodecane, paraffin, water, honey, or is made of a material which is solid and electrically insulating at room temperature and which is preferably selected from paraffin wax and hot-melt adhesive.

In one embodiment, step c) is performed using a laser, preferably having a wavelength in a wavelength range which is at least partially absorbed by said substrate material and/or said insulating layer, if present.

In one embodiment, step c) is performed such that heating of the insulating layer necessary for a electric field reduction across this layer necessary to initiate step b) and d) is leading to a significant increase in temperature of the substrate leading to a significant change of its temperature dependent mechanical parameters such as hardness and brittleness.

In one embodiment, steps a)-d) are performed once, such that a first structure is generated in the first substrate region, thereafter the substrate is moved by a defined distance, and steps b)-d) are performed a second time such that a second structure is generated in a second substrate region, wherein, preferably, steps b)-d) are performed n times, such that an array of n structures is generated in said substrate, n being an integer$>1$.

In one embodiment, said electrical energy applied in step b) is sufficient to generate a through hole or through channel in said substrate in performing step d).

In another embodiment, said electrical energy applied in step b) is not sufficient to generate a through hole or through channel in said substrate in performing step d) and is sufficient to change the structure in said substrate region, wherein, preferably, step d) changes the structure in said substrate region by heating and/or melting the material present in said substrate region, and wherein such change in structure makes said substrate region more amenable to treatment by an ablating step e) in which said substrate including said substrate region is exposed to an ablating environment such as an etching agent.

In one embodiment, said electrical energy is not sufficient to cause an ejection of material from said substrate region.

In one embodiment, the method according to the present invention further comprises step e) exposing said substrate including said substrate region to an ablating environment, such as an etching agent.

If, in the embodiment where step d) changes the structure in said substrate region by heating and/or melting the material present in said substrate region, an insulating layer is present on said substrate, such insulating layer is preferably removed after the structure in said substrate has been changed.

In one embodiment, said substrate is electrically semiconducting at room temperature and is preferably made of a semiconducting material selected from elemental silicon, including doped silicon and crystalline silicon, germanium, compound semiconductors such as gallium arsenide, and indium phosphide.

In one embodiment, said ablating environment is an etching agent and preferably is an etching agent selective for semiconducting materials, and is more preferably selected from KOH, $SF_6$, tetramethylammonium hydroxide (TMAH), ethylenediamine pyrocatechol (EDP), hydrazine, and HF.

In one embodiment, said ablating environment is created by a reactive ion etching process.

In one embodiment, said ablating environment is $SF_6$ used for etching.

In one embodiment, steps b) and d) are performed a number of times n, n being an integer$>1$, thereby applying electrical energy to a first, second, third, . . . n-th region of said substrate, and thereby changing the structure in said first, second, third, . . . n-th region of said substrate.

In one embodiment, the method according to the present invention further comprises step e), wherein step e) is performed once after steps b) and d) have been performed a number of times n, thereby generating an array of n structures in said substrate.

In one embodiment, said substrate is elemental silicon and said etching agent is selected from KOH, TMAH, $SF_6$.

In one embodiment, a crystalline substrate is chosen having crystal orientation reducing the etch rate parallel to the substrate surface compared to differently oriented substrates.

In one embodiment, a crystalline substrate is chosen having crystal orientation reducing the etch rate perpendicular to the substrate surface compared to differently oriented substrates, such as a <111> silicon wafer in KOH.

In one embodiment, the substrate is coated with a protective layer not or less etched by an etching agent than the substrate itself and which during performing step a)-d) is fully or partially removed or structurally altered so as to allow etching only at the region(s) where step d) has been performed.

In one embodiment, the method according to the present invention uses the insulating layer, as defined above, as protective layer.

The objects of the present invention are also solved by a structure or an array of structures, preferably holes or cavities or channel or wells or recesses, in a substrate, produced by the method according to the present invention.

In a first aspect the present invention relates to a method of introducing a structure or structural change, preferably a hole or cavity or channel or well or recess physically or only defined by structural change such as a transition from a crystalline to an amorphous microstructure, in a substrate located between (at least) two electrodes which are connected to a controlled voltage supply. Energy provided by the voltage source which is fully or in part locally dissipated within the substrate controlled through the voltage magnitude and/or source impedance and the time over which the voltage is applied. In general the voltage can be a function of application time V(t), which changes due to changes of the electric circuit during application and/or a programmed and/or feedback circuit analysing the substrate current and/or voltage. During voltage application the energy dissipation inside the substrate is controlled so as to achieve local changes in the physico-chemical properties of the substrate such as the transformation of crystalline regions into amorphous regions by raising T in the dissipation region up to the respective melting or transition T. The process may be explicitly stopped before any topological changes such as the formation of holes take place. To initiate the dissipation process in the first place it may be necessary to supply auxiliary heat to the modification region so as to locally increase the temperature and therefore conductivity of the region as already disclosed and outlined in WO2005/097439 and PCT/EP2008/009419 However, the placement of the auxiliary heat allows to define the region which will be modified.

For the application of voltages to substrates in general, the nature and dimensions of substrates and structures, reference is made to WO2005/097439 and PCT/EP2008/009419, which are hereby incorporated in their entirety by reference thereto.

Figure 2A:
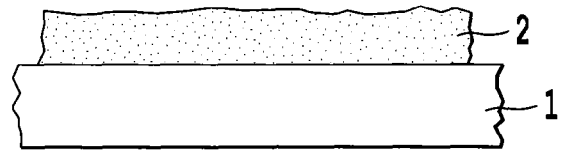
Figure 2B:
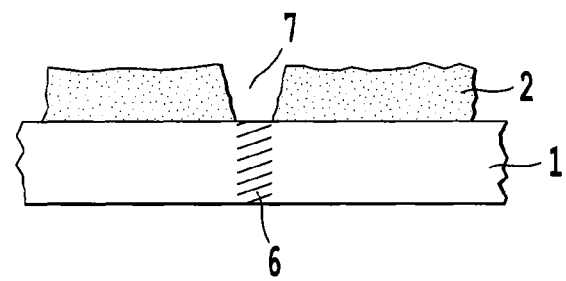
Figure 2C:
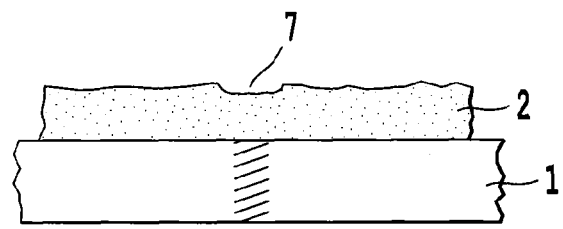

For certain substrates, e.g. such having a high conductivity or such having already holes which cause the applied voltage to short-cut, the substrate (1) is attached to one or two insulating layers (2) (FIG. 1). These layers effectively shield the applied voltage (electrodes 3, 3', voltage supply 4, laser 5 or 5', in FIG. 1) from the substrate, e.g. by having a very high resistivity or by the induction of a counter field within them (as is the case when using polar substances such as water). In other words, part or in some cases most of the voltage applied via the electrodes creates an electric field across the insulating layer thereby reducing the electric field inside the substrate, which can effectively lead to a dramatic reduction of field inside the substrate for a constant voltage across the electrodes, thereby preventing discharges at voltages which would otherwise initiate an electric break-down within the substrate. To initiate the energy dissipation within the substrate the insulating layer has to be raised in conductivity or removed at the site where the attached substrate is to be modified. This can be done upon irradiation (e.g. UV) or heating of this site using e.g. a laser, or by means of a high frequency electromagnetic field causing dissipation in the substrate. After modification of the substrate (see also FIG. 2), which may involve the formation of holes as e.g. described in WO 2005/097439 or PCT/EP2008/009419, or the local change (6) of the physico-chemical properties as described before, the insulating layer, which has been opened and melted and/or evaporated in parts (7), may be closed again (7) to proceed with the modification of additional regions within the substrate (FIG. 2). Using e.g. fluid or gel like insulating layers such as pure water or hydrocarbons (wax, dodecane, paraffin, . . . ) the insulating layer may close by itself (7) e.g. due to surface tension or substrate adhesion. Solid layers may be closed using heat induced reflux which may be initiated with application of the auxiliary heat, the energy dissipation process itself or by a subsequent heating step after modification. Such layers, with a thickness in the range of 1 um to 1 cm, preferably from 10 um to 1 mm, may be used to avoid the deposition of the material extracted from the substrate over the surface surrounding the structure, absorbing the expelled material and preventing its adhesion to the substrate (see FIG. 10). The combination and repetition of the described steps allows for multiple such substrate structure changes in close spatial proximity to each other e.g. organized in form of an array. To increase the precision in the spatial displacement of such structures, the insulating layer may be used to create a mask, e. g. by mechanical ablation or by laser evaporation/decomposition of portions of insulating material. This will expose only selected regions of the substrate where the structure will be introduced, defining with increased precision the position of such structures on the substrate (FIG. 11). Using e.g. a solid wax layer such a mask may be created by piercing or punching the layer at positions where structures are to be introduced, e.g. by means of a needle, which may be the electrode itself, discovering a region of the substrate of diameter in the range of 10 nm to 1 mm, more preferably 1 um to 100 um At these positions the wax is partially or totally removed defining the position for the dissipation of electrical energy during step d).

In a further device and method according to the present invention the forgoing methods and devices are used to introduce structural changes within the substrate that modify the physico-chemical properties at the dissipation site(s) in such a way that exposure of the substrate to ablative environments such as an etching solution or reactive ion plasma (RIE) leads to a differential material ablation in the modified and unmodified regions. If the modified region is attacked more strongly hole and well like structures will result, in the opposite case columns of modified regions will stick out of the ablated substrate. The etching step may also be performed to modify structures produced according to WO 2005/097439 and PCT/EP2008/009419 as the heated and expelled material has for certain materials new physico-chemical properties that allow e.g. the ablation of redeposited material or the increase of the produced hole(diameter). An example are holes produced in Si wafers as described and subsequently exposed to a warm solution of 50% KOH (e.g. at 80° C.). It should be noted that the term "elemental silicon" or "silicon" includes crystalline (monocrystalline or polycrystalline) silicon such as is used in silicon wafers. The term also includes doped silicon.

To protect the non-modified substrate better during the etching step, effectively allowing to immerse the entire wafer or one side of the wafer to the etching agent, the substrate may be covered with a protective layer. This usually thin layer (typically <10 um) is removed or altered at the modification region(s) providing only there access of the etching agent to the substrate. An example is a Si3N4 layer of typically <1 um thickness on an Si wafer. Using subsequently KOH based etching media the Si wafer is not etched due to the nitride layer—except where energy was dissipated.

In order to achieve optimal etching results, such as a reduced etch rate perpendicular the axis of the formed structure or a reduced/increased etch rate perpendicular to the substrate surface the crystal lattice orientation of the substrate may be selected accordingly (where applicable). An example is the usage of <111> Si wafer treated with KOH solution to reduce the etch rate perpendicular to the wafer surface thereby further increasing the etch rate differences between modified and unmodified regions.

The combination of ablation and micro-structural substrate changes in the formation of holes has, because internal pressure during such step is smaller compared to a step where material is actively expelled from the forming structure, the advantage that breakages or deformation of crevices are less likely to occur. Moreover, subsequent polishing steps which might otherwise have been necessary can be avoided because the conditions applied to the substrate are generally gentle enough and no depositions of substrate material on the substrate surface occur.

According to the present invention, the inventors have established devices and methods to apply electrical energy to a substrate which electrical energy is not sufficient to cause the formation of a through hole or through channel in the substrate but which makes the structure of the region in which the electrical energy is applied, more amenable to a subsequent etching step. In accordance with embodiments of the present invention, the substrate is placed between two electrodes connected to a voltage supply capable of causing an electrical discharge through the substrate upon (1) increase of the field strength between the electrodes by e.g. increase in voltage (typically 1000-300 000 V), (2) closing of the electrode distance or (3) local heating of the substrate or (4) local heating of an insulating layer attached to the substrate. The discharge and therefore the voltage supply is controlled so as to provide an electrical power P(t) over a time interval Dt. The interplay between power and time thereby determines the T-profile building up inside the substrate. Without wishing to be bound by any theory the present inventors believe that this method, in significantly heating the substrate in a defined substrate region, changes the structure of said region. Again, without wishing to be bound by any theory, the present inventors believe that a less ordered structure is generated by such heating procedure. For example, in substrates which are crystalline such as wafers used for chip manufacturing, the method is believed to lead to an amorphous structure upon raising the temperature locally to or close to the melting point. The region in which said electrical energy has been applied, therefore becomes more amenable to etching, and subsequently gets etched selectively upon application of an etching agent. An example is the process applied to silicon in <100> orientation with >10 Ohm cm conductivity and 0.25 mm thickness, electrode spacing between substrate and electrode 0.5 mm each, V=2000V, C ca 1 nF and Dt<100 msec produces holes of ca 30-100 um in diameter upon etching with 50% KOH solution at 80° C. In preferred embodiments of this aspect according to the present invention, the step b) and d) in which electrical voltage is applied to a region of a substrate and consequently electrical energy locally dissipated, is repeated n-times, n being an integer>1, and thereafter the etching step is performed, thus leading to the generation of n structures in the substrate. This aspect according to the present invention is particularly suitable for the formation of arrays of structures in electrically semiconducting substrates and application for TSV (Through-hole silicon via).

Figure 3:
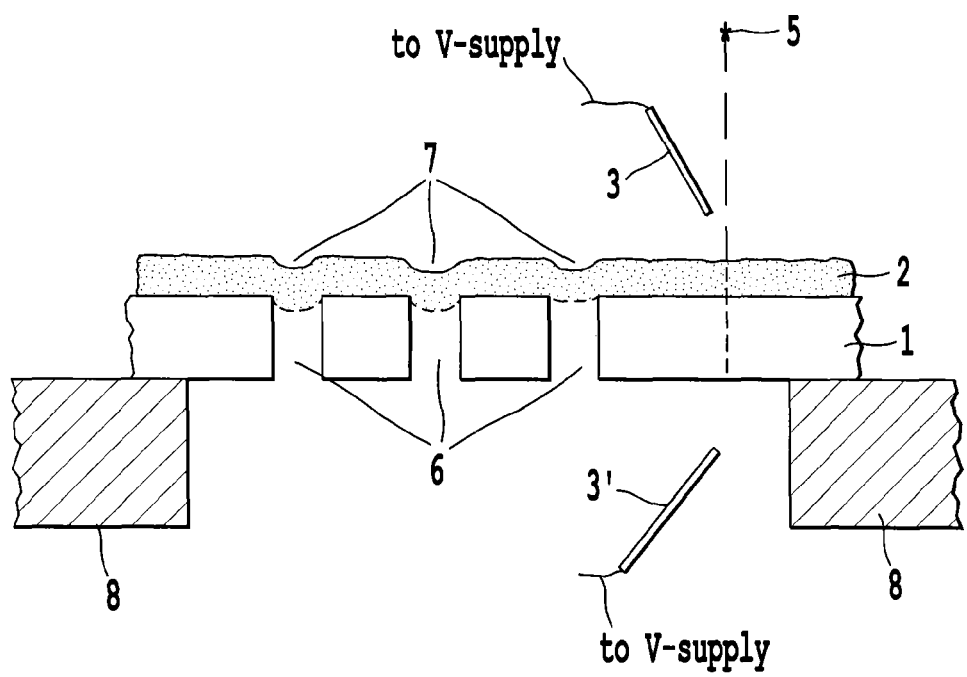

In embodiments according to the present invention, the inventors have also introduced an insulating layer in methods of generating structures in substrates using electrical energy. The step is important for rather conducting substrate materials such as semiconductors as well as arrays of holes in all substrates where in the first case the entire wafer and in the second the pre-existing holes have to be shielded from the applied voltage thus that only the part of the substrate to be modified is exposed to the electrical field so as to define accordingly this region as the discharge place (FIG. 3). The insulating layer may consist of gaseous, such as SF6, liquid such as paraffin and water as well as solid materials such as wax. The layer must shield sufficiently from the applied voltage so as to avoid discharges without further invention. This may occur purely through insulating, that is properties of high resistivity of the insulating layer as well as shielding properties where the applied voltage induces a counterfield within the insulating layer, which is usually the case in polar materials such as water. The actual discharge process, that is the dissipation of energy within the substrate is initiated upon local raise in conductivity of the insulating layer, e.g. by heating a defined region which lies opposite and adjacent to the region of the substrate, in which the structure is to be generated. Such defined region in the insulating layer, herein also sometimes referred to as an "insulating region", allows after the change in resistivity or change in the dielectric properties such as the dielectric constant, that a current starts flowing through it and consequently through the adjacent region of the substrate, thereby effectively determining the region of the substrate where energy is dissipated. In preferred embodiments, such insulating region becomes liquid or melts and can be subsequently fully or in part evaporated when the generation of the structure through application and subsequent dissipation of electrical energy to the substrate occurs. However, since the insulating layer typically is still liquid or molten around said region, it may reflow into the generated structure and thereby closes and/or at least partially fills it. In one embodiment after performing step d), there may be a further step f) in which additional energy, preferably heat, is applied to said insulating region, so as to melt or liquefy said insulating layer again or to keep the insulating layer liquid or molten. Preferred means of applying additional energy, either in step c) or step f) are selected from a heated electrode, a heating element, a laser, a focussed light source a gas torch or a high frequency electromagnetic field source, dissipating energy in the material. An example of a high frequency electromagnetic source is a Tesla transformer which can be used in accordance with the present invention. In preferred embodiments, the means for heating is a laser. The laser can heat the insulating layer directly (beam is directly absorbed) or indirectly (the beam is absorbed by substrate and heat is transferred to the insulating layer by heat conduction), or a combination wherein both layers absorb partially. The selection of a specific laser depends on the substrate and insulation material. Examples are $CO_2$-laser having a wavelength of 10.6 μm. Other preferred lasers are lasers having a wavelength in the range of from 800 nm to 1300 nm. It should be noted that the laser wavelength is also chosen such that it is absorbed by the insulating layer and heats it, and/or it is absorbed by the substrate which heats the insulating layer. This allows a heating of the insulating layer. Absorption may be 100% or less, i.e. substantially all or fractions of the incident radiation is absorbed by the substrate or the insulating layer or both. As used herein, the term "is at least partially absorbed" is meant to refer to any scenario wherein the substrate and/or the insulating layer absorbs 0.1% to 100% of the incident radiation. As used herein, the term "insulating layer" refers to a layer that is attached to the substrate, preferably in a side-by-side-manner, such that the insulating layer and the substrate are adjacent and opposite to each other. In this arrangement the region, in which a structure is to be generated in the substrate is also sometimes referred to as a "substrate region", and the corresponding region in the insulating layer lying opposite such substrate region, is also referred to as "insulating region". Effectively, such insulating region lies on top of or underneath said substrate region. In one embodiment, the insulating region and the substrate region are of the same size. In another embodiment, the insulating region is 5% or more, such as 10%, 15%, 20%, 25%, 30%, ..., 100%, 200%, 300%, 400%, ... 1.000%, 2.000%, 3.000%, ..., 10.000% or more larger in area than the substrate region.

The use of an insulating layer in the aforementioned sense in a method of generating a structure has several advantages: It avoids short circuits occurring if several structures are generated in the substrate, because once a structure, such as a hole, is formed, it is subsequently closed and therefore unavailable as a potential by-path for electrical energy to be dissipated when subsequent structures are to be generated. Moreover, the insulating layer also provides structural support to the substrate and stabilizes it. In some embodiments there may be more than one insulating layer, for example one insulating layer on either side of the substrate. Furthermore, the use of an insulating layer allows the production of several structures in a substrate next to each other, such that an array of structures in a substrate is formed. The method according to the present invention is therefore amenable to mass-production and also allows the formation of structures which are close to each other. For example, in a substrate made of an electrically semiconducting material, such as silicon wafers of >100 Ohm cm and <0.5 mm thickness, the structures of e.g. 30 um diameter formed therein using a insulating layer in accordance with the present invention, may be as close to each other as 60 μm.

For certain substrate materials, in particular low conducting materials such as glass, the insulating layers and the substrate may have to be heated to initiate the energy dissipation process. Therefore, the method/device described for microstructural changes as well as the method/devices disclosed in WO2005/097439 and PCT/EP2008/009419 may be combined with it so as to not only heat the insulating layer but effectively raising the temperature of the underlying substrate region to initiate the energy dissipation step. This becomes of importance when producing arrays in insulating materials where the insulating layer shields pre-existing holes and the heating is necessary to not only make the insulating layer more conductive but also the substrate in order to initiate the discharge process. However, pre-heating of the substrate prior to the actual energy dissipation process in step d) taking place may also be employed to change mechanical substrate parameters such hardness and brittleness and thus to reduce or avoid the formation of cracks within the substrate. Finding an optimum for this pre-heating requires a certain ratio between heat absorption of the substrate and the insulating layer. Typically, this ratio is controlled and can be determined by choosing the wavelength of the initiation laser in step d) and the substrate side from which heat is applied.

Figure 4:
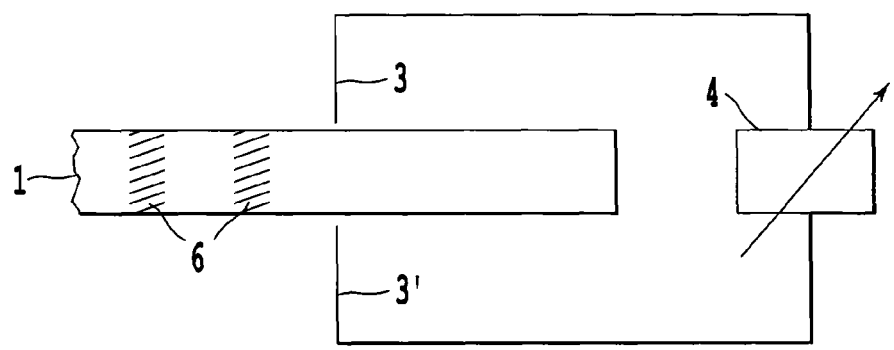

In accordance with the control of the energy dissipation aspect of the present invention, the inventors have surprisingly found that it is possible to generate structures, preferably holes or cavities or channels or recesses in a substrate using electrical energy which is applied to the substrate, wherein the amount of energy is solely defined by the voltage applied across the electrodes and the time over which such voltage is applied. Other parameters to control and features to control them are no longer necessary. In previous patent applications, the overall amount of energy that is applied to the substrate had been limited by an appropriate capacitor, or the rate of dissipation of the energy stored across the substrate had been controlled by an ohmic resistor. In the present aspect of the method according to the present invention, these features are no longer necessary, and the amount of electrical energy applied can be defined only by the defined duration of step b) and the defined voltage applied in step b). This makes the process very versatile and very easy to perform. It is particularly suitable for semiconducting substrates such as standard silicon wafers, wherein preferred voltage ranges are from 100 V to $10^5$ V, more preferably 1.000 V to 15.000 V, and preferred durations of step b) are 10 ms to 2 s, preferably 50 ms to 500 ms. Furthermore, especially with semiconducting substrates, it is no longer necessary to use additional energy, such as heat to be applied, in order to generate the structure (FIG. 4). According to this aspect, the method according to the present invention can be performed without a source of additional energy, such as heat, for example a laser, and the amount of electrical energy is solely determined by the applied voltage and the duration of step b), which parameters come to lie in the ranges of 100 V-100.000 V, preferably 1.000 V to 15.000 V, and 10 ms to 2 s, preferably 50 ms to 500 ms. The size of the structure generated is only dependent on these two parameters. Accordingly, the use of an additional energy source, such as a laser in these embodiments is no longer necessary.

In yet a further aspect according to the present invention, the present invention relates to individual structures in substrates, such as holes, cavities, channels etc. in substrates, as well as arrays of such structures in substrates, produced by any of the aforementioned methods according to the various aspects.

Using the method according to the present invention, structures and arrays of structures may be formed having dimensions in the μm range or even below.

More specifically, using the method and the device according to the present invention, the controlled formation of holes 0.1-10 μm in diameter with aspect ratios≤330 and arranged in arrays has been achieved in amorphous dielectrics, such as glass and fused silica, by fast resistive heating. A strongly focussed hyper-exponential temperature increase inside the dielectric led to fast material melting and evaporation. Time intervals between melting and evaporation were estimated ~$10^{-11}$ s with power densities reaching 100 W/μm³. The hole size was a function of the substrate conductivity σ(T) and the applied voltage U(t) and characterized by a high reproducibility. The exemplary application of large aspect ratio holes in electroosmotic pumps and low noise ion channel measurements was demonstrated.

In the following reference is made to the examples and figures which show the following:

EXAMPLES

FIG. 1 depicts an embodiment for the formation of holes using an insulating layer. The insulating layer (2) is attached to the substrate (1) and placed between two electrodes (3, 3') connected to a user and optionally process controlled voltage source (4). Upon application of a voltage between the electrodes sufficient for dielectric break-down within the substrate the insulating layer reduces the actual voltage across the substrate below the break-down threshold. Upon further increase of the voltage or optionally heat induced local breakage of the insulating layer using either laser 5 or 5' the energy dissipation step inside the substrate is triggered. The duration (as well as the voltage source properties)

determine the extension of the region where energy was dissipated and therefore the temperature profile within this substrate region.

FIG. 2 illustrates the substrate (1)—insulating layer (2) compound undergoing modification. In (A) the combination is shown before modification, in (B) energy has been dissipated and the actual modification process has been terminated. The substrate region has been altered (6) and the insulating layer is opened (7). (C) shows the combination after the insulating layer has resealed. This last step may occur spontaneously (as with liquid insulators such as water or dodecane or with solid insulators that heat up sufficiently to reflow such as paraffin wax) or after local or global re-heating of the substrate. For the latter process a laser used for process initiation may be used (in absence of voltage) to heat the insulator surrounding the modified region.

FIG. 3 illustrates the formation of multiple structures in close proximity on a single substrate. After formation of holes (6) in the substrate (1) and resealing (7) of the insulating layer (2) the substrate attached to a moveable support (8) is moved, voltage applied to the electrodes (3, 3') and the dissipation process restarted using a focused laser beam (5). Closing of the pre-existing holes is—depending on the inter-hole distance and voltage magnitude—required to prevent pre-discharges through the already existing holes where e.g. a gas such as air breaks down much quicker than the actual substrate (e.g. glass).

FIG. 4 depicts and embodiment for the introduction of structural changes using voltage induced dielectric breakdown rather than laser induction. For that electrodes (3, 3') are placed in close proximity to the substrate (1) determining the break-down and energy release position on the wafer. The close substrate-electrode distance also allows for relatively low voltages to start the dissipation process, in particular in semiconductors for which this setup is most suited. The voltage source (4) is programmed to either produce open holes or microstructural changes such as a transformation of a crystalline region into an amorphous region (6). Voltage magnitude and application time determine the extension and the degree of transformation inside the substrate. High voltages for short durations provide regions narrow in diameter while longer application time, and if necessary lower voltages to avoid evaporation, provide larger diameter regions. The newly formed regions (6) may have a higher electrical resistivity than the untransformed substrate thus avoiding short-circuiting and the usage of insulating layers.

Figure 5:
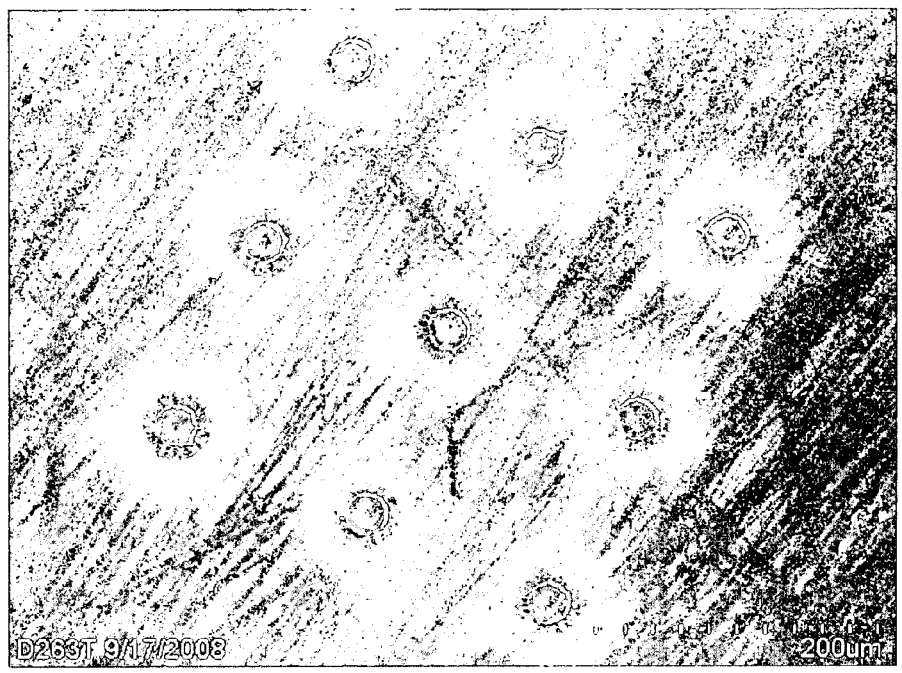

FIG. 5 shows an array of holes generated in a 150 um thick borosilicate glass substrate using an insulating layer of paraffin wax of a thickness<500 um on one side. The DC voltage applied was 9 kV and was switched off at a trans-substrate current of 300 uA. The discharge process was initiated by laser irradiation at a wavelength of 10.6 um (CO2-laser) and a power of 5 W for 20 ms using a focal spot of 100 um in diameter. Other insulating layers (see above) are also possible (results not shown).

Figure 6:
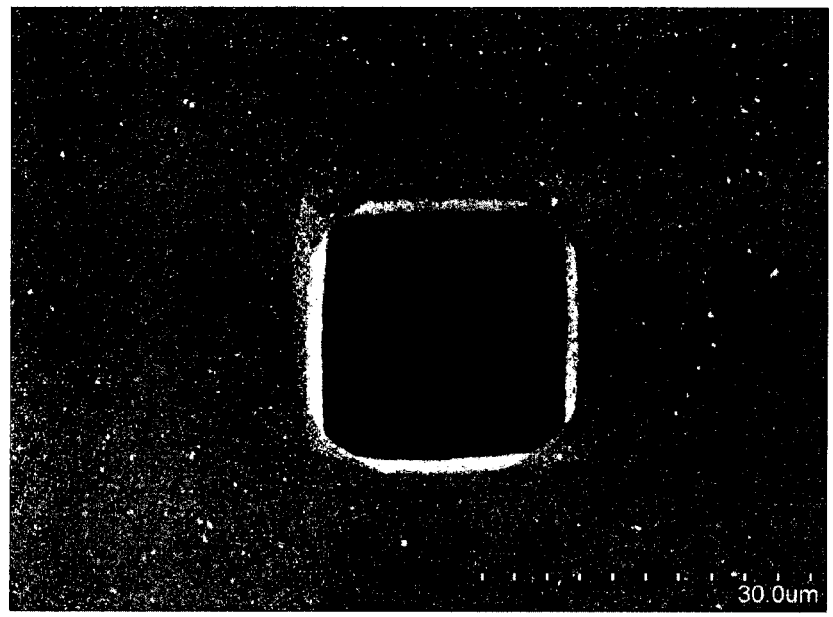

FIG. 6 shows a through-hole generated in a silicon substrate using the method employing a final etching step after introducing a structural change without creating a through-hole, as outlined above. The silicon wafer was 254 um thick with an electrical resistivity of >100 Ωcm (P-Boron doped). A DC voltage of 2 kV was applied for 20 ms without using an insulating layer and additional heat. The distance between electrode and substrate was approximately 0.4 mm on each side. KOH (50%, 80° C.) was used as the etching agent, and the square-like appearance of the hole results from the <100> orientation of the wafer.

Figure 7:

FIG. 7 shows an array of holes generated in a silicon substrate using a <1 mm thick insulating layer of hot melt adhesive (Pattex PTK6) on one side. The silicon wafer had a thickness of 275 um, an electrical resistivity of >300 Ωcm (P-Boron doped) and <100> orientation. The DC voltage applied was 7 kV for 600 ms. Electrode distance was approximately 0.4 mm to the substrate and 1 mm to the insulating layer. The discharge process was initiated by laser irradiation at a wavelength of 10.6 um (CO2-laser) and a power of 3.5 W for 600 ms using a focal spot of 100 um in diameter. Other insulating layers, such as dodecane, etc. (see above) are also possible (results not shown).

Figure 8:

FIG. 8 shows an enlarged picture of a hole generated in a 254 um thick silicon wafer with an electrical resistivity of >100 Ωcm (P-Boron doped) and <100> orientation. The hole was created by applying a DC voltage of 3 kV for 400 ms, without using an insulating layer and additional heat. The distance between electrode and substrate was approximately 0.5 mm on each side. The substrate has been subsequently polished.

Figure 9:
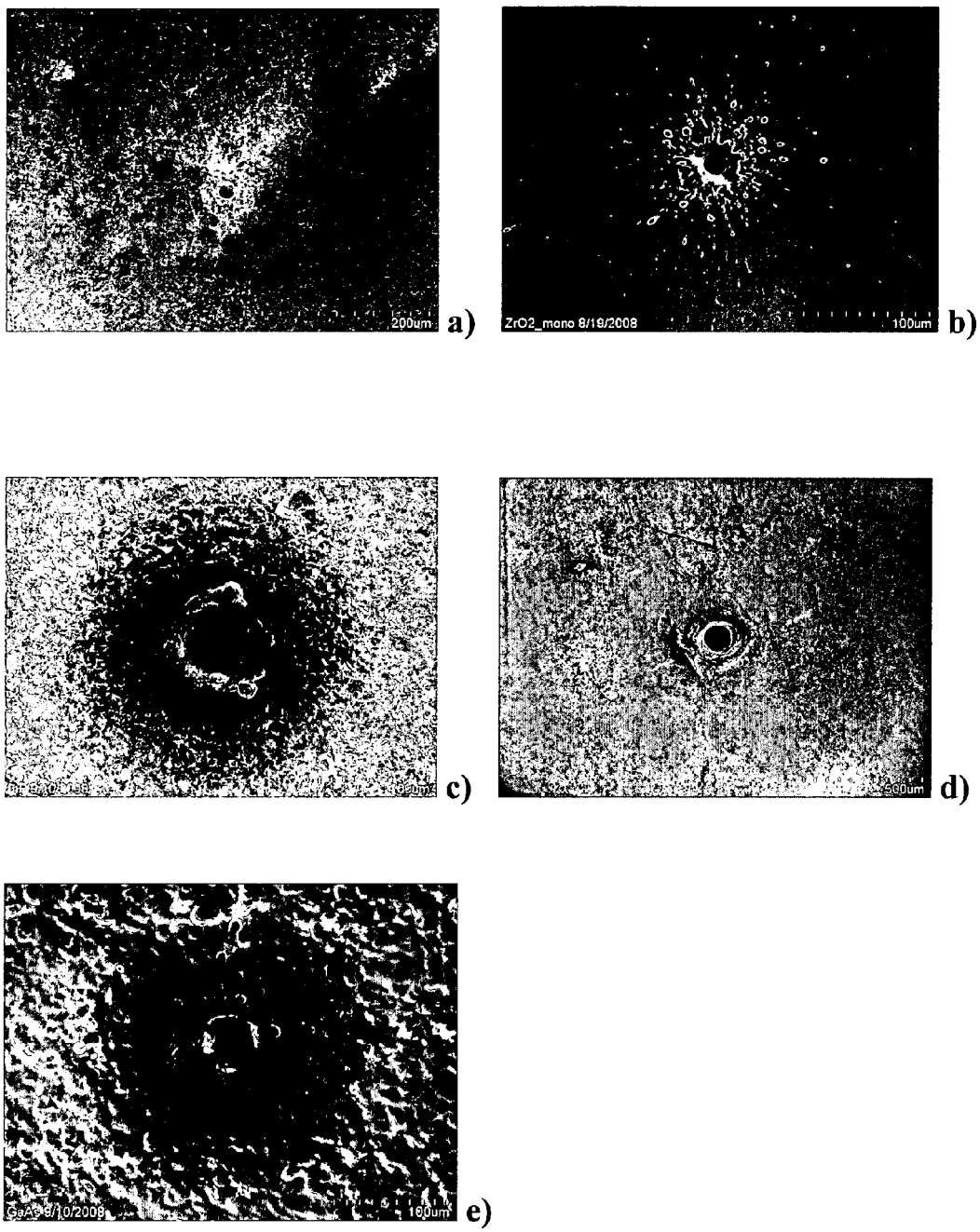

FIG. 9a) shows a hole generated in a 400 um thick substrate of monocrystalline zirconia (ZrO2) using a voltage of 10 kV for 800 ms and an irradiation of laser light at a wavelength of 10.6 um (CO2-laser), power of 10 W, focal diameter of 100 um for initiation.

FIG. 9b) shows a hole generated in a 300 um thick substrate of polycrystalline zirconia (ZrO2) using a voltage of 8 kV for 500 ms and an irradiation of laser light at a wavelength of 10.6 um (CO2-laser), power of 8 W, focal diameter 100 um for initiation. After hole formation the surface was mechanically polished.

FIG. 9c) shows a hole generated in a 400 um thick substrate of sapphire using a voltage of 10 kV for 2000 ms and an irradiation of laser light at a wavelength of 10.6 um (CO2-laser), power of 22 W, focal diameter 100 um for initiation.

FIG. 9d) shows a hole generated in a 500 um thick substrate of indium phosphide with an electrical resistivity of 0.0016 Ohm cm and orientation <100> using an insulating layer of Parafilm M. The applied voltage was 11 kV for 200 ms. The process was initiated by irradiation of laser light at a wavelength of 1064 nm (fiber-laser), power of 20 W, focal diameter of approximately 20 um.

FIG. 9e) shows a hole generated in a 400 um thick substrate of gallium arsenide with an electrical resistivity of 0.158 Ohm cm and orientation <111> using an insulating layer of Parafilm M. The applied voltage was 10 kV for 200 ms. The process was initiated by irradiation of laser light at a wavelength of 1064 nm (fiber-laser), power of 20 W, focal diameter of approximately 20 um.

Figure 10:
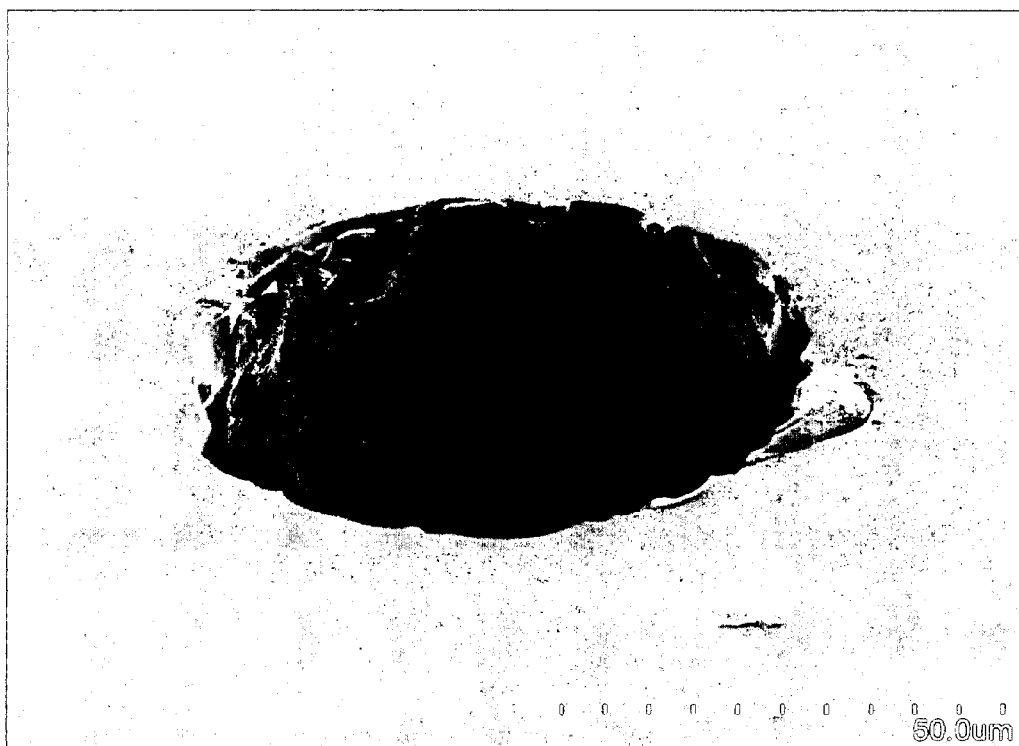

FIG. 10) shows a hole generated in a 250 um thick substrate of monocrystalline silicon using a voltage of 3 KV for 200 ms, using a solid paraffin layer 200 um thick (Paraplast Plus, Fluka) as insulating/protecting layer to avoid the deposition of the extracted material on the substrate.

Figure 11A:
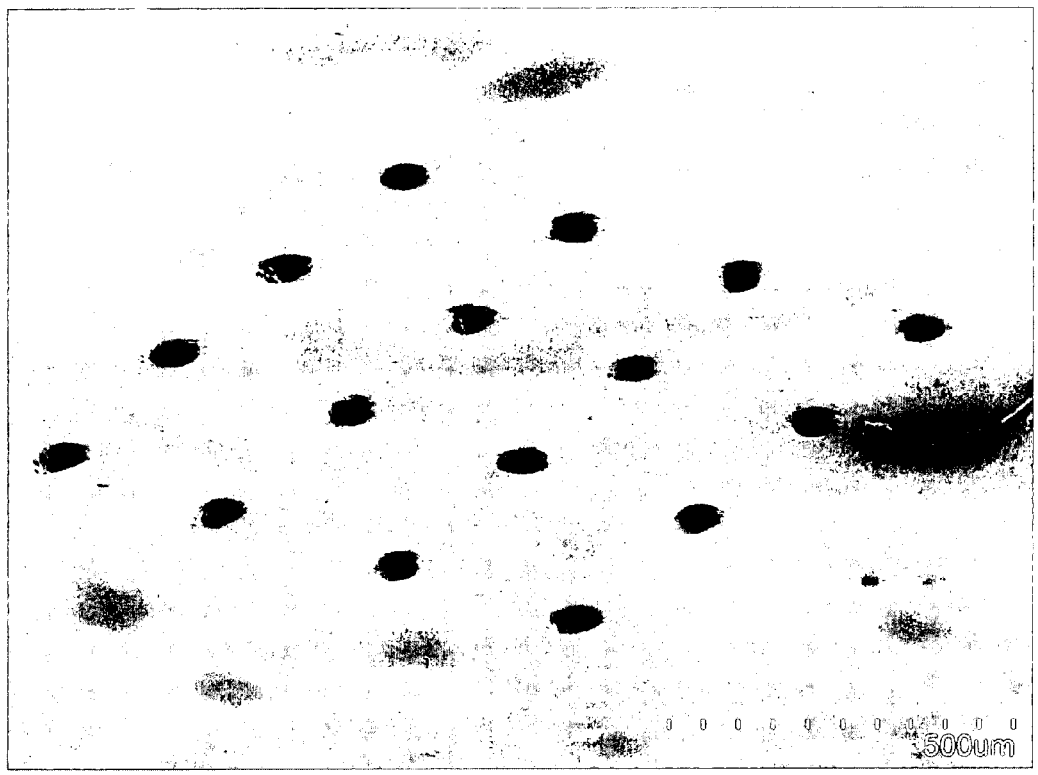

FIG. 11a) shows an array of holes generated in a 250 um thick substrate of monocrystalline silicon using 3 KV for 200 ms for each hole, using paraffin as insulating/protecting layer.

Figure 11B:
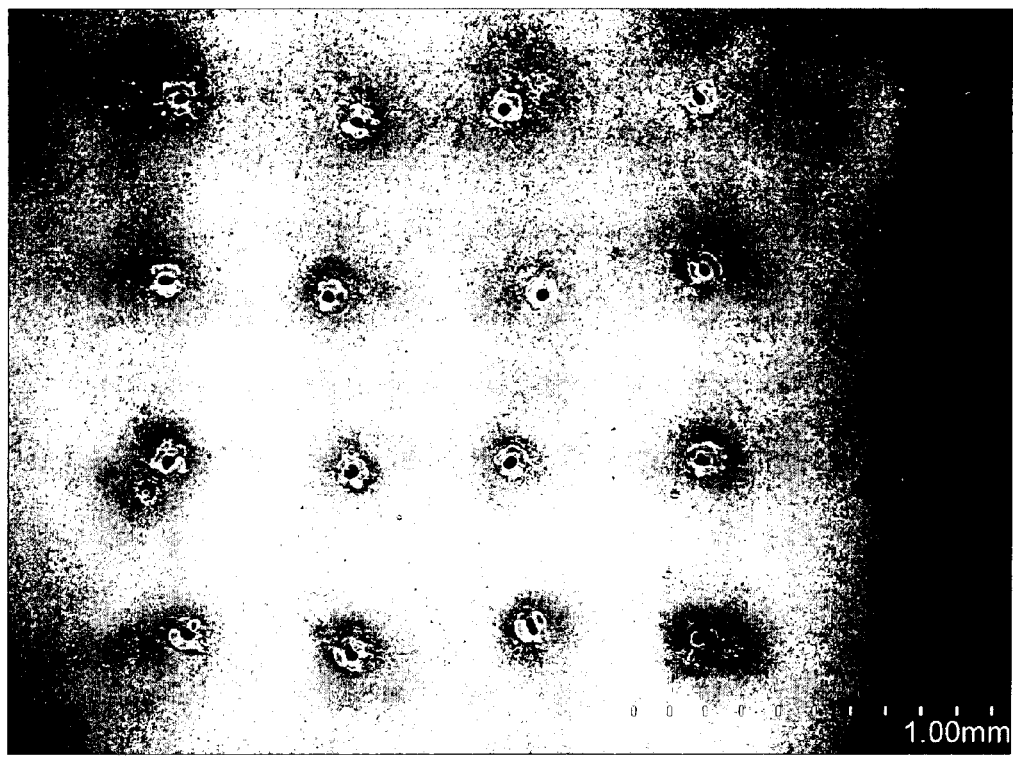

FIG. 11b) shows an array of holes generated using the same parameters of the array in FIG. 11a) but without any insulating/protecting layer, allowing the extracted material to settle in the area surrounding each hole.

The features of the present invention disclosed in the specification, the claims and/or in the accompanying drawings, may, both separately, and in any combination thereof, be material for realizing the invention in various forms thereof.

The invention claimed is:

1. A method of introducing a structure or a structural change in a substrate or a region thereof, said method comprising:
   a) placing a substrate which is electrically insulating or semiconducting at room temperature between at least two electrodes connected to a user-controlled voltage supply;
   b) applying, with said user-controlled voltage supply, a voltage of user-defined magnitude across a region of said substrate, said voltage giving rise to an increase in electrical current through said substrate or said region, thereby applying a defined amount of electrical energy to said substrate;
   c) applying additional energy to said substrate or said region so as to increase a temperature and an electrical conductivity of said substrate or said region so as to initiate the current flow in the applying b), said additional energy originating either from an additional energy or heat source or from components of said voltage applied in the applying b); and
   d) dissipating said electrical energy applied in b) in said substrate,
   wherein the dissipating d) is controlled solely by (i) the user-defined magnitude of the applied voltage of the applying b), (ii) a user-defined period of time of the applying b), (iii) an impedance of said voltage supply, or (iv) any combination of (i)-(iii);
   wherein said control of the dissipating d) by controlling (i), (ii), (iii), or (iv), is achieved by solely user-defining (i), (ii), (iii), or (iv), and without a programmed or feedback circuit analyzing a trans-substrate current or trans-substrate voltage over time; and
   wherein said substrate which is electrically insulating at room temperature or electrically semiconducting at room temperature is provided in a) having at least one electrically insulating layer attached; and
   wherein said electrically insulating layer has an insulating region which is adjacent to and in contact with a substrate, wherein in a region of the substrate a structure or structural change is to be introduced,
   wherein the applying c) is performed such that said electrically insulating layer, if provided as a solid in a), is liquefied in said insulating region, or is performed such that said electrically insulating layer, if provided as a liquid in a), is partially evaporated in said insulating region, and
   wherein during the dissipating d), said electrically insulating layer is partially displaced in said insulating region, through the dissipation of said electrical energy, and wherein, after the dissipating d), a gaseous, liquefied, or partially evaporated electrically insulating layer flows into said structure and thereby closes and at least partially fills said structure.

2. The method of claim 1, wherein said user-defined magnitude of voltage is in a range of 10 V to $10^6$ V.

3. The method of claim 1, wherein said user-defined period of time is in a range of from 1 ms to 5000 ms.

4. The method of claim 1, wherein said impedance of said voltage supply is an impedance >1 Ohm.

5. The method of claim 4, wherein said impedance is in a range from 1 Ohm to 1 GOhm.

6. The method of claim 1, wherein said electrically insulating or semiconducting substrate comprises a material selected from the group consisting of a carbon comprising polymer, a fluoropolymer, a silicon-comprising substrate, a silicon-comprising polymer, a semiconducting material, a compound semiconductor, an aluminum-comprising crystalline material, and a ceramic.

7. The method of claim 1, wherein the dissipating d) is initiated by either
   (i) applying a voltage of user-defined magnitude across a region of said substrate in the applying b), said user defined magnitude of voltage giving rise to an increase in electrical current through said substrate or said region and a subsequent dissipation of said electrical energy in said substrate,
   (ii) applying a voltage of user-defined magiutude across a region of said substrate in the applying b), said user defined magnitude of voltage not giving rise to an increase in electrical current through said substrate or said region and to a subsequent dissipation of said electrical energy in said substrate, and reducing the distance between each of the electrodes and the substrate and, optionally, contacting said substrate with said electrodes,
   (iii) performing the applying c), or (iv) a combination of (i)-(iii).

8. The method of claim 1, wherein the applying c) is omitted.

9. The method of claim 8, wherein said substrate is a substrate having an electrical resistivity $\leq 10^9$ Ω cm at room temperature.

10. The method of claim 8, wherein said substrate is electrically semiconducting at room temperature.

11. The method of claim 1, wherein the applying c) is performed.

12. The method of claim 11, wherein the applying c) is performed with an additional energy source which is selected from the group consisting of a heated electrode, a heating element, a laser, a focused light source, a UV light source, a gas flame, and a high frequency electromagnetic field device.

13. The method of claim 12, wherein said additional energy source is a laser.

14. The method of claim 11, wherein a site of application of additional energy in the applying c) determines the region of said substrate in which said structure or said structural change is introduced.

15. The method of claim 1, wherein said electrically insulating layer is solid, liquid, or gaseous at room temperature.

16. The method of claim 15, wherein said electrically insulating layer is gaseous at room temperature and is not air.

17. The method of claim 1, wherein said electrically insulating layer has an insulating region which is adjacent to and in contact with said substrate, wherein in a region of said substrate a structure or structural change is to be introduced, and
   wherein the applying c) is performed such that, in said electrically insulating layer, the electrical conductivity is raised in said insulating region so as to reduce its voltage shielding effect and augmenting the trans-substrate voltage in said substrate region.

18. The method of claim 17, wherein said electrically insulating layer is attached to said substrate in such a manner that it covers said substrate in a) or is covered by said substrate in a), and said substrate region lies opposite said insulating region.

19. The method of claim 1, wherein the insulating layer reduces the voltage across the substrate by formation of an internal counter electric field due to electrical polarization of material comprised in the insulating layer.

20. The method of claim 1, wherein the insulating layer is employed to create a mask on said substrate, which mask exposes only the region or regions of the substrate where a structure or several structures or a structural change or several structural changes will be introduced.

21. The method of claim 1, wherein the insulating layer is employed to improve flatness/surface quality of the region surrounding the structure introduced by absorbing material ejected during the dissipating d) into the insulating layer and thus avoiding redeposition of said ejected material directly onto the substrate surface.

22. The method of claim 1, wherein the applying c) is performed by directly heating the insulating layer through absorption of laser radiation of a wavelength absorbed by the insulating layer.

23. The method of claim 1, wherein the applying c) is performed by indirectly heating the insulating layer by heating the attached substrate and utilizing heat transfer from the heated substrate to the attached insulating layer.

24. The method of claim 1, wherein said electrically insulating layer comprises a material which is solid and electrically insulating at room temperature.

25. The method of claim 1, wherein said electrically insulating layer comprises a material which is liquid at room temperature, and which is electrically insulating at room temperature or polar or both.

26. The method of claim 1, wherein said electrically insulating layer comprises a material which is gaseous at room temperature.

27. The method of claim 1, wherein said substrate is electrically insulating at room temperature.

28. The method of claim 27, wherein said substrate has an electrical resistivity $\leq 10^9$ Ohm cm at room temperature.

29. The method of claim 27, further comprising an electrically insulating layer comprising a material which is solid and electrically insulating at room temperature.

30. The method of claim 27, wherein the applying c) is performed with a laser.

31. The method of claim 1, wherein said substrate is electrically semiconducting at room temperature.

32. The method of claim 31, wherein said substrate has an electrical resistivity $\leq 10^9$ Ohm cm at room temperature.

33. The method of claim 31, further comprising an electrically insulating layer comprising a material which is liquid and electrically insulating at room temperature, or polar, or both, or
comprising a material which is solid and electrically insulating at room temperature.

34. The method of claim 31, wherein the applying c) is performed with a laser.

35. The method of claim 1, wherein the applying c) is performed such that heating of the insulating layer necessary for an electric field reduction across the insulating layer necessary to initiate b) and d) leads to an increase in temperature of the substrate leading to a change of its temperature dependent mechanical parameters.

36. The method of claim 1, wherein a)-d) are performed once, such that a first structure is generated in a first substrate region, thereafter the substrate is moved by a defined distance, and b)-d) are performed a second time such that a second structure is generated in a second substrate region.

37. The method of claim 36, wherein b)-d) are performed n times, such that an array of n structures is generated in said substrate, n being an integer >1.

38. The method of claim 1, wherein said electrical energy applied in b) generates a through hole or through channel in said substrate in performing the dissipating d).

39. The method of claim 1, wherein said electrical energy applied in b) is not generating a through hole or through channel in said substrate in performing the dissipating d) and changes the structure in said substrate region.

40. The method of claim 39, wherein the dissipating d) changes the structure in said substrate region by at least one of heating a material and melting the material present in said substrate region, and
wherein such change in structure makes said substrate region more amenable to treatment by an ablating e), comprising exposing said substrate including said substrate region to an ablating environment.

41. The method of claim 40, wherein said substrate is elemental silicon and wherein said substrate region is treated by said ablating e) in which said substrate including said substrate region is exposed to an etching agent, wherein said etching agent is selected from the group consisting of KOH, TMAH, and $SF_6$.

42. The method of claim 39, wherein said electrical energy is not causing an ejection of material from said substrate region.

43. The method of claim 39, wherein said substrate is electrically semiconducting at room temperature.

44. The method of claim 39, wherein b) and d) are performed a number of times n, n being an integer >1, thereby applying electrical energy to a first, second, third, . . . n-th region of said substrate, and thereby changing the structure in said first, second, third, . . . n-th region of said substrate.

45. The method of claim 39, further comprising:
e) exposing said substrate including said substrate region to an ablating environment.

46. The method of claim 45, wherein said ablating environment is an etching agent.

47. The method of claim 45, wherein said ablating environment is created by a reactive ion etching process.

48. The method of claim 45, wherein said ablating environment is $SF_6$ employed for etching.

49. The method of claim 45, wherein e) is performed once after b) and d) have been performed a number of times n, thereby generating an array of n structures in said substrate.

50. The method of claim 45, wherein said substrate is a crystalline substrate having crystal orientation reducing an etch rate parallel to a surface of the substrate compared to a differently oriented substrate.

51. The method of claim 45, wherein said substrate is a crystalline substrate having crystal orientation reducing an etch rate perpendicular to a surface of the substrate compared to a differently oriented substrate.

52. The method of claim 45, wherein the substrate is coated with a protective layer not or less etched by an etching agent than the substrate itself and which during performing a)-d) is fully or partially removed or structurally altered so as to allow etching only at the at least one region where the dissipating d) has been performed.

53. The method of claim 52, wherein the protective layer is an electrically insulating layer attached to the substrate.

54. A method of introducing a structure or a structural change in a substrate or a region thereof, said method comprising:

a) placing a substrate which is electrically insulating or semiconducting at room temperature between at least two electrodes connected to a user-controlled voltage supply;

b) applying, with said user-controlled voltage supply, a voltage of user-defined magnitude across a region of said substrate, said voltage giving rise to an increase in electrical current through said substrate or said region, thereby applying a defined amount of electrical energy to said substrate;

c) applying additional energy to said substrate or said region so as to increase a temperature and an electrical conductivity of said substrate or said region so as to initiate the current flow in the applying b), said additional energy originating either from an additional energy or heat source or from components of said voltage applied in the applying b); and d) dissipating said electrical energy applied in b) in said substrate, wherein the dissipating d) is controlled solely by (i) the user-defined magnitude of the applied voltage of the applying b), (ii) a user-defined period of time of the applying b), (iii) an impedance of said voltage supply, or (iv) any combination of (i)-(iii);

wherein control of the dissipating d) by controlling (i), (ii), (iii), or (iv), is achieved with a programmed or feedback circuit analyzing a trans-substrate current or trans-substrate voltage over time; and wherein said substrate which is electrically insulating at room temperature or electrically semiconducting at room temperature is provided in a) having at least one electrically insulating layer attached; and wherein said electrically insulating layer has an insulating region which is adjacent to and in contact with a substrate, wherein in a region of the substrate a structure or structural change is to be introduced, wherein the applying c) is performed such that said electrically insulating layer, if provided as a solid in a), is liquefied in said insulating region, or is performed such that said electrically insulating layer, if provided as a liquid in a), is partially evaporated in said insulating region, and wherein during the dissipating d), said electrically insulating layer is partially displaced in said insulating region, through the dissipation of said electrical energy, and wherein, after the dissipating d), a gaseous, liquefied, or partially evaporated electrically insulating layer flows into said structure and thereby closes and at least partially fills said structure.

* * * * *